(12) United States Patent
Ahearn

(10) Patent No.: US 10,072,343 B2
(45) Date of Patent: Sep. 11, 2018

(54) AIR QUALITY BY ELIMINATING GREENHOUSE GAS EMISSIONS THROUGH A PROCESS OF CONVERSION OF FLUE GASES INTO LIQUID OR SEMI-SOLID CHEMICALS

(71) Applicant: John Ahearn, Burkburnett, TX (US)

(72) Inventor: John Ahearn, Burkburnett, TX (US)

(73) Assignee: EMISSION CONTROL ASSOCIATES, Murfreeboro, TN (US)

( * ) Notice: Subject to any disclaimer, the term of this patent is extended or adjusted under 35 U.S.C. 154(b) by 219 days.

(21) Appl. No.: 15/197,082

(22) Filed: Jun. 29, 2016

(65) Prior Publication Data

US 2017/0028343 A1    Feb. 2, 2017

Related U.S. Application Data

(66) Substitute for application No. 14/701,408, filed on Apr. 30, 2015, now abandoned.

(51) Int. Cl.
*C25B 3/00* (2006.01)
*B01D 53/14* (2006.01)
*B01D 53/32* (2006.01)

(52) U.S. Cl.
CPC .............. *C25B 3/00* (2013.01); *B01D 53/14* (2013.01); *B01D 53/32* (2013.01); *B01D 2252/103* (2013.01); *B01D 2257/302* (2013.01); *B01D 2257/304* (2013.01); *B01D 2257/404* (2013.01); *B01D 2257/502* (2013.01); *B01D 2257/504* (2013.01); *B01D 2257/602* (2013.01); *B01D 2258/0283* (2013.01); *Y02P 20/151* (2015.11); *Y02P 20/152* (2015.11)

(58) Field of Classification Search
None
See application file for complete search history.

(56) References Cited

U.S. PATENT DOCUMENTS 3,824,163 A * 7/1974 Maget .................. B01D 53/326
205/352

* cited by examiner

*Primary Examiner* — Arun S Phasge

(57) ABSTRACT

Apparatus for removing Greenhouse Gases from combustion of fossil and non-fossil fuels, including hydrocarbons and biomass fuels, is disclosed. The apparatus includes: a vessel containing a liquid medium; a circulation system with a pump; a plurality of positively charged metal plates, each with a plurality of apertures; a negatively charged discharge pipe connected to the circulation pipe; a refrigeration system on the outside of the vessel; and a power source. The apparatus uses the process of electrolysis and electrostatic induction to form covalent bonding among various constituents of Greenhouse Gases and thereby converts and condenses all or most of Greenhouse Gases in the emission. The apparatus has a working prototype. The apparatus can be used in converting and condensing all or some Greenhouse Gases from emissions of power plants and all types of industrial plants which generate Greenhouse Gases as emissions, as well as from various sources of vehicular emissions.

8 Claims, 7 Drawing Sheets

AIR QUALITY BY ELIMINATING GREENHOUSE GAS EMISSIONS THROUGH A PROCESS OF CONVERSION OF FLUE GASES INTO LIQUID OR SEMI-SOLID CHEMICALS

FIELD OF THE INVENTION

The present invention relates generally to improving air quality, and more particularly to removal of Greenhouse Gases (e.g., SOx, NOx, CO, $CO_2$, $H_2S$, Mercury, particulate matters, and many other trace elements) from flue gases resulting from burning of hydrocarbon fuels such as oil (including kerosene, gasoline, diesel), natural gas, coal, wood, biomass, and any other flammable materials that contain hydrocarbons.

BACKGROUND OF THE INVENTION

A hydrocarbon is an organic compound consisting primarily of hydrogen and carbon. The majority of hydrocarbons found on Earth naturally occur in crude oil, natural gas, coal and biomass. Hydrocarbons are a primary energy source for current civilizations. The predominant use of hydrocarbons is as a combustible fuel source. The inherent ability of hydrocarbons to bond to themselves is known as catenation, and allows hydrocarbon to form more complex molecules, such as cyclohexane, and arenes such as benzene. Greenhouse Gases are products which include primarily incomplete combustion of fuel such as oil, natural gas, coal, or wood. For example, emissions from power plants, industrial plants, refineries, transportation vehicles (including ships, trucks, buses, trains, cars, etc.) are major sources of Greenhouse Gases.

Volatile organic compounds (VOCs) are another pollutant resulting from burning hydrocarbon fuels. They are categorized as either methane ($CH_4$) or non-methane (NMVOCs). The aromatic NMVOCs benzene, toluene, and xylene are suspected carcinogens, and may lead to leukemia with prolonged exposure. 1,3-butadiene is another dangerous hydrocarbon often associated with industrial use.

SUMMARY OF THE INVENTION

In one aspect, the present invention is a system for removing Greenhouse Gases (e.g. SOx, NOx, CO, $CO_2$, $H_2S$, Mercury, particulate matters, and many other trace elements) from flue gases resulting from combustion of fuels including oil (including kerosene, gasoline, diesel), natural gas, coal, wood, biomass, and any other flammable materials; the flue gases or emissions are passed through and suspended in a liquid medium; the system includes: a vessel containing a liquid medium and having a circulation inlet and a circulation outlet; a circulation pump connected to the circulation inlet and the circulation outlet and configured to circulate the liquid medium contained in the vessel; a plurality of positively charged ferrous or non-ferrous material or metal plates arranged in various configurations, each plate in the plurality including a plurality of apertures formed in the plate that connect opposite sides of the plate; a circulation pipe connected to the circulation inlet and spanning the plurality of plates; a negatively charged discharge pipe connected to the circulation pipe and having a substantially perpendicular section at the end of the discharge pipe and located on a side opposite the circulation outlet; covering the discharge pipe is a screen of dissimilar material to the process of electrolysis; a power source having positive and negative connections; wherein metal plates in the plurality are connected to the positive connection and the discharge pipe is connected to the negative connection; and an external cooling system will be applied to maintain the temperature of the vessel as required.

In an embodiment, there is a power source connecting the plates. In an embodiment, the apertures in the plates of various sizes extend from rear-facing sides of the plates to front-facing sides of the plates. In an embodiment, plates in the plurality are arranged sequentially and are spaced apart depending on the vessel size and the volume and flow of flue gas intake.

In an embodiment, the discharge pipe includes a slit running substantially the length of the discharge pipe. In an embodiment, the slit is covered by a metallic screen, the metallic screen having a different metal from the plates in the plurality. In an embodiment, the vessel has a floor and the discharge pipe is located near the floor. In an embodiment, the slit faces the floor. In an embodiment, the discharge pipe includes a first end and a second end located at opposite ends of the slit. In an embodiment, the first and second ends are capped. In an embodiment, a drain valve is located near the surface of the liquid medium in the vessel. In an embodiment, the circulation pump includes an electric motor delivering about 1.5 horsepower. In an embodiment, the vessel is constructed from PE plastic and has a volume capacity of about 180 gallons. The size of the vessel, most of its internal parts, and the circulating pumps can be modified depending on the volume and flow rate of flue gas coming into the vessel.

In another general aspect, the present invention is a Greenhouse Gas condenser resulting from combustion of flue gases; the system was used with burning of diesel fuel, gasoline and coal, and the end products resembled DEHA (defined below), road tar, and asphalt. The system includes: a vessel containing a medium circulated within the vessel by a circulation pump to aid electrolysis; a source of flue gas (as described in this paragraph above) connected to the circulating medium, the flue gas containing hydrocarbon molecules collected from combustion of hydrocarbon fuels; a plurality of positively charged metal plates having apertures through which the medium is circulated within the vessel; a circulation pipe connected to a discharge pipe, the discharge pipe having a slit running substantially the length of the negatively discharge pipe, the slit covered in a metallic screen material, the material made of a different metal than the positively charged metal plates in the plurality; and a power source having a negative lead connected to the metallic screen material and positive leads connected to the metal plates in the plurality.

In yet another aspect, the present invention provides a method and a process of removing all emissions from a transport vehicle using hydrocarbon fuels, including coal, diesel, gasoline, LNG, natural gas, propane, etc.

In various test runs with this system, the outputs varied in nature and composition. Various outputs obtained from conversion and condensing of various fuels included large range of chemicals; however, the predominant chemicals were DEHA (in liquid form), road tar, asphalt, and other petrochemical traces. The flue gas from diesel fuel was mostly converted into a complex hydrocarbon called Bis (2-ethylhexyl) Adipate or DENA [$C_{22}H_{42}O_4$]—an ester of diethyl-hexanol and adipic acid. Gas Chromatography Mass Spectrometry (GC-MS) analyses of end product samples, conducted at a chemistry lab, indicated that a number of long chain hydrocarbons are present from 14 to 45 carbons in mass. Properties of end-products will vary with composition of hydrocarbon fuels used in the plant—e.g. calorific values, contents of sulfur, traces of other elements, etc. However, the dominant end product will be a condensed, hydraulic fluid (with or without coloration) called DEHA or a chemical approximating DEHA in its structure and composition. Likewise, end products from burning of coal and other hydrocarbons passing through this system produced parking lot tar, asphalt, DEHA, and several other trace elements. Nature of these outputs was confirmed in chemical analyses done in various laboratory tests.

In one significant aspect, unlike any other emission control technology used before, this system has successfully converted 100% of all Greenhouse Gases, most notably Carbon monoxide and Carbon dioxide, from the flue gases into liquid and/or semi-solid chemicals. When used on a large scale, this technology has the potential to eliminate emissions from fossil and non-fossil fuel burning plants by converting them into chemicals which with or without processing can be used in various applications.

BRIEF DESCRIPTION OF THE DRAWINGS

Many features and advantages from the various embodiments of the present invention will become apparent to one skilled in the art upon reading the following detailed description, when considered in conjunction with the accompanying drawings.

Figure 1:
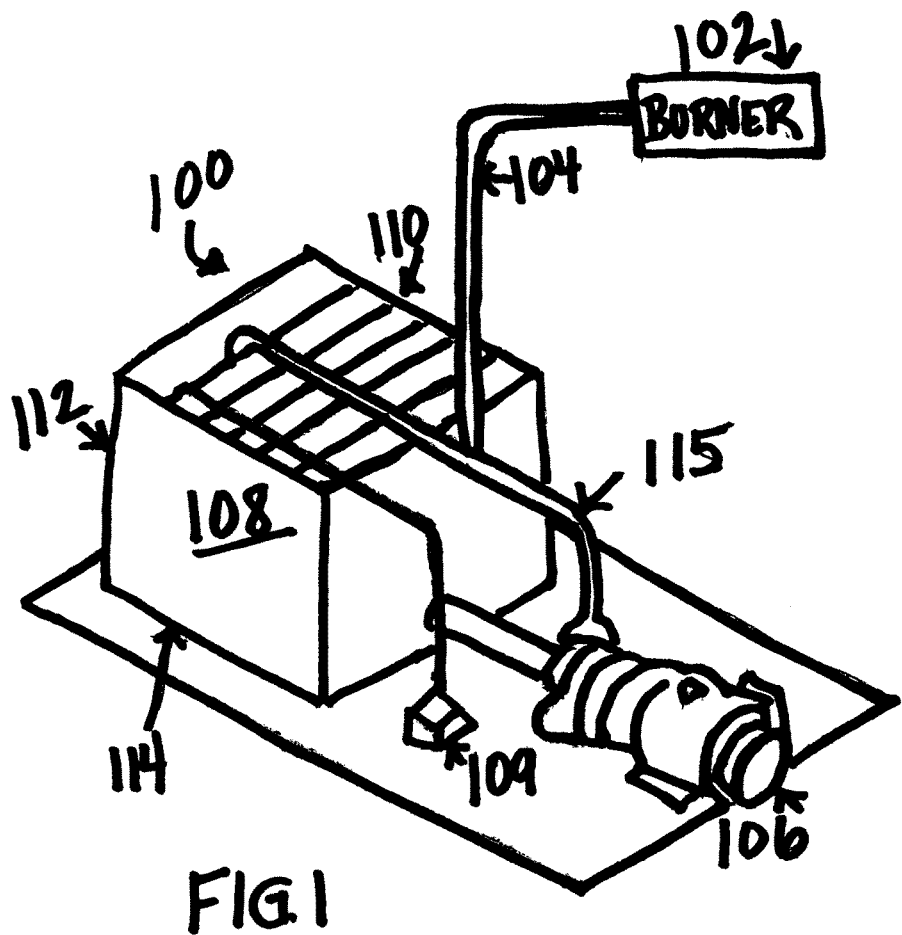
FIG. 1 is a perspective view of the system for improving air quality as viewed from the front.
Figure 2:
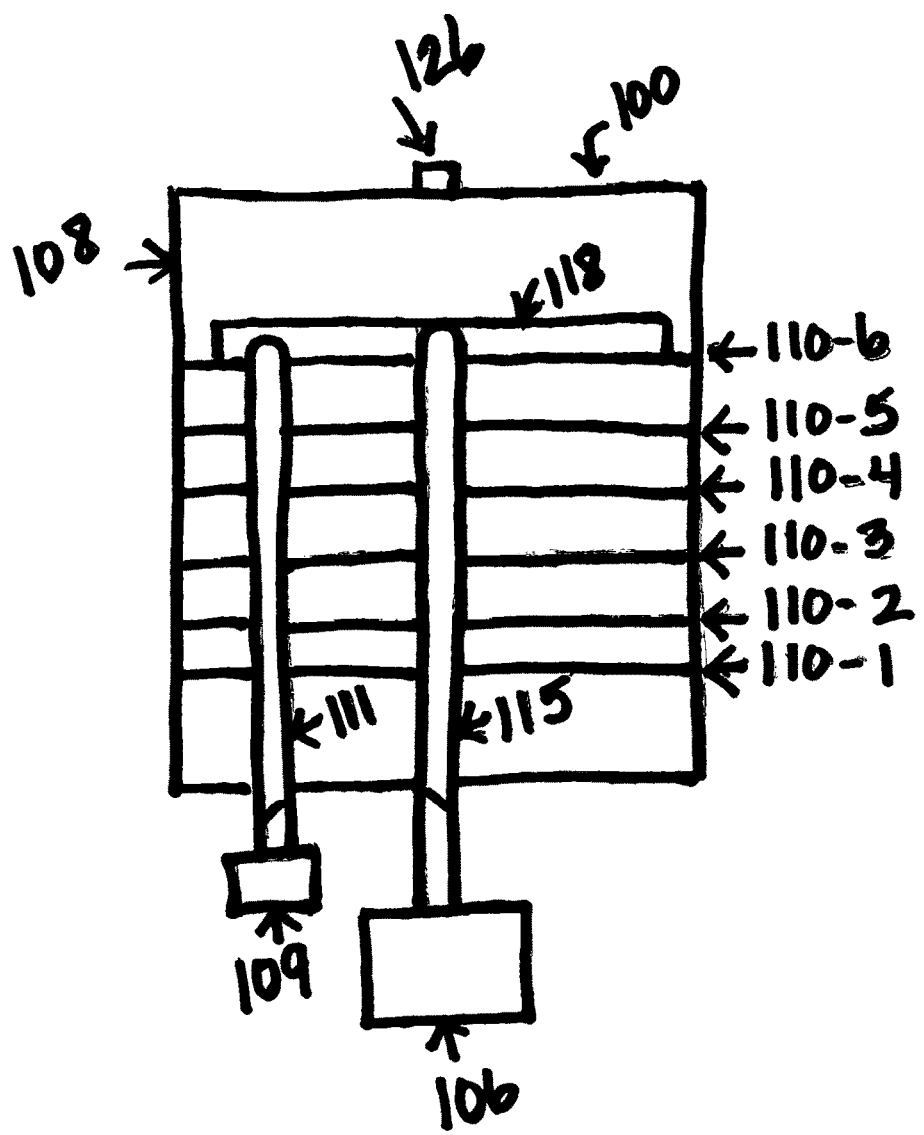
FIG. 2 is a plan view of the system.
Figure 3:
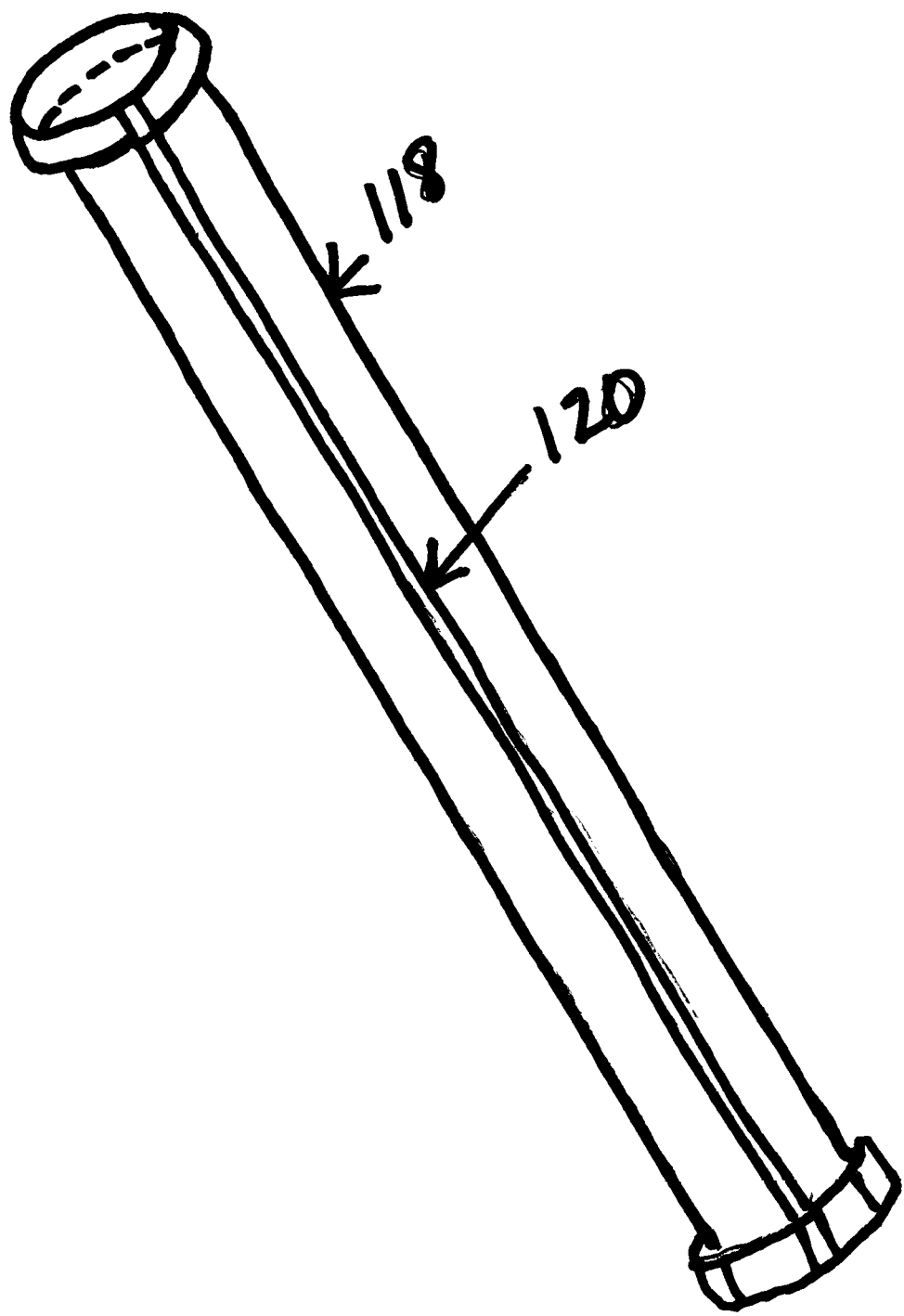
FIG. 3 is a perspective view of a discharge pipe having a slit.

DETAILED DESCRIPTION OF THE INVENTION:

Typical flue gas from burning of fossil, non-fossil and biomass fuels contains variable amounts of nitrogen oxides (NOx), sulfur oxides (SOx), hydrogen sulfides ($H_2S$), and particulate matters, as well as nitrogen ($N_2$), carbon monoxide (CO) and carbon dioxide ($CO_2$). The composition of the flue gas mixture varies according to the specific fuel, and the particular application, for example: trucks, tractors, generators, automobiles, diesel vehicles, industrial emissions, and oil well flares. The present invention uses several processes that prevent these and other associated compounds from being emitted into the atmosphere. The processes described below are applied to the present invention shown in FIGS. 1-4. For the first time, the present invention collects about 100% of the Greenhouse Gases from the flue gases, converts and condenses them into various chemical outputs, and thereby substantially prevents Greenhouse Gas discharge from the vessel. For the first time, this emission control and elimination system has successfully converted 100% of all Greenhouse Gases, most notably Carbon monoxide and Carbon dioxide, unlike any other technology or process used so far.

Electrostatic induction is the redistribution of electrical charge in an object, caused by the influence of nearby charges. Due to induction, the electrostatic potential (voltage) is constant at any point throughout a conductor. Electrostatic induction is a method to create or generate static electricity in a material by bringing an electrically charged object near it. This causes the electrical charges to be redistributed in the material, resulting in one side having an excess of either positive (+) or negative (−) charges.

Certain non-conductive materials can also be given a static electric charge by electrostatic induction. In these cases, it is caused by the polarization of their molecules. In its normal, neutral state, an electrically conducting object typically has an equal number of positive (+) and negative (−) electrical charges, such as positive ions, negative ions, and electrons, intermingled within the material.

When a static electrically charged object is brought near the conductor, the electrical charges on or near the surface of the object attract the opposite charges in the conductor and repel the like charges.

Various chemical bonds and forces acting together bind molecules together. The two most basic types of bonds are characterized as either ionic or covalent. In ionic bonding, atoms transfer electron(s) to each other. Ionic bonds require at least one electron donor and one electron acceptor. In contrast, atoms that have the same electronegativity share electrons in covalent bond since neither atom preferentially attracts or repels the same electrons.

Ionic bonding is the complete transfer of valence electron(s) between atoms. It is a type of chemical bond that generates two oppositely charged ions. In ionic bonds, the metal loses electrons to become a positively charged cation, whereas the non-metal accepts those electrons to become a negatively charged anion. Ionic bonds require an electron donor (metal), and an electron acceptor (nonmetal). Ionic bonding is observed because metals have few electrons in its outer-most orbital. By losing those electrons, these metals can achieve noble-gas configuration and satisfy the Octet Rule. Similarly, a nonmetal that has close to eight electrons in its valence shell tends to readily accept electrons to achieve its noble gas configuration. In ionic bonding, more than one electron can be donated or received to satisfy the Octet Rule. The charge on the anion and cation corresponds to the number of electrons donated or received. In ionic bonds, the net charge of the compound must be zero.

Covalent bonding is the sharing of electrons between atoms. This type of bonding occurs between two atoms of the same element or elements close to each other in the periodic table. The bonding occurs primarily between nonmetals; however, it can also be observed between nonmetals and metals as well.

When molecules have similar electronegativity, that is same affinity for electrons, covalent bonds are most likely to occur. Since both atoms have the same affinity for electrons and neither is willing to donate them, they share electrons in order to achieve octet configuration and become more stable. In addition, the ionization energy of the atom is too large and the electron affinity of the atom is too small for ionic bonding to occur. For example, carbon does not form ionic bonds since it has four valence electrons, i.e., half of an octet. To form ionic bonds, carbon molecules must either gain or lose 4 electrons. This is highly unfavorable. Therefore, carbon molecules share their four valence electrons through single, double, and triple bonds so that each atom can achieve noble gas configurations. Covalent bonds can include interactions of the sigma and pi orbitals; therefore, covalent bonds lead to formation of single, double, triple, and quadruple bonds.

Ionic and covalent bonds are the two extremes of bonding. Polar covalent is the intermediate type of bonding between the two extremes. Some ionic bonds contain covalent characteristics and some covalent bonds are partially ionic. For example: most carbon-based compounds are covalently bonded but can also be partially ionic. Polarity is a measure of the separation of charge in a compound. A compound's polarity is dependent on the symmetry of the compound as well as differences in electronegativity between atoms. Polarity occurs when the electron pushing elements, left side of the periodic table, exchanges electrons with the electron pulling elements, right side of the periodic table. This creates a spectrum of polarity, with ionic (polar) at one extreme, covalent (nonpolar) at another, and polar covalent in the middle.

Both of these bonds are important in organic chemistry. Ionic bonds are important because they allow the synthesis of specific organic compounds. Scientists can manipulate ionic properties and these interactions in order to form products they desire. Covalent bonds are especially important since most carbon molecules interact primarily through covalent bonding.

Electrolysis is an electro-chemical process in which current is passed between two electrodes through an ionized solution known as an electrolyte to deposit negative ions known as anions on the positive electrode known as a cathode and positive ions known as cations on the negative electrode known as an anode. Electrolytic corrosion occurs when dissimilar metals are in contact in the presence of an electrolyte, such as water containing very small amounts of acid. The dissimilar metals set up a galvanic action in which one of the dissimilar metals deteriorates. The present invention for cleaning flue gas combines both processes into a system that removes hydrocarbons from a liquid medium within an electrolytic cell embodied as Greenhouse Gas removal system 100.

Figure 4:
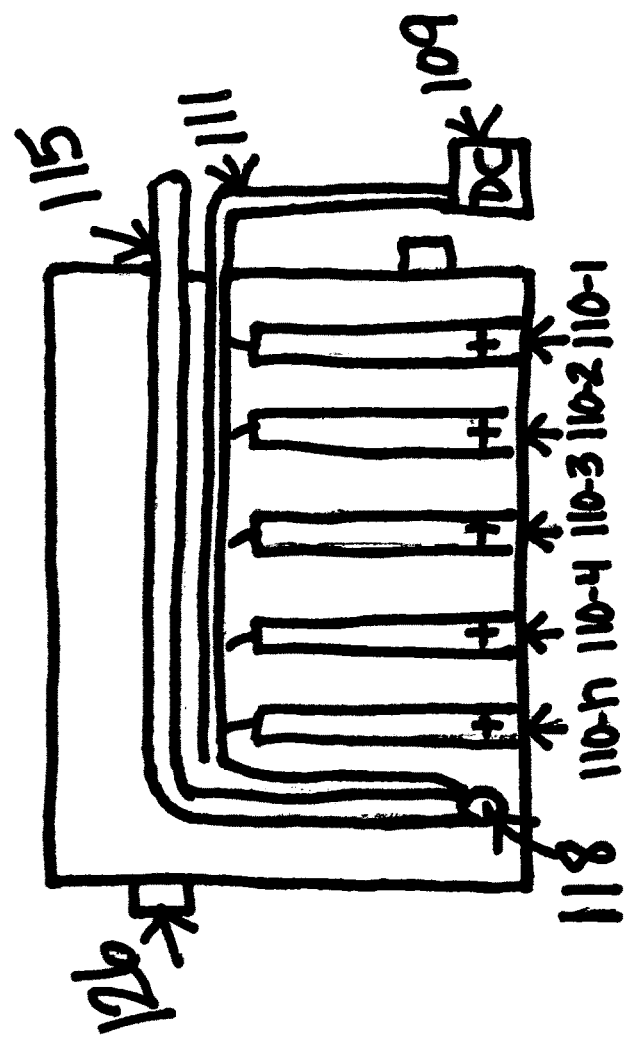
FIG. 4 is an elevation view from the side of the system showing electrical connections.
Figure 5:
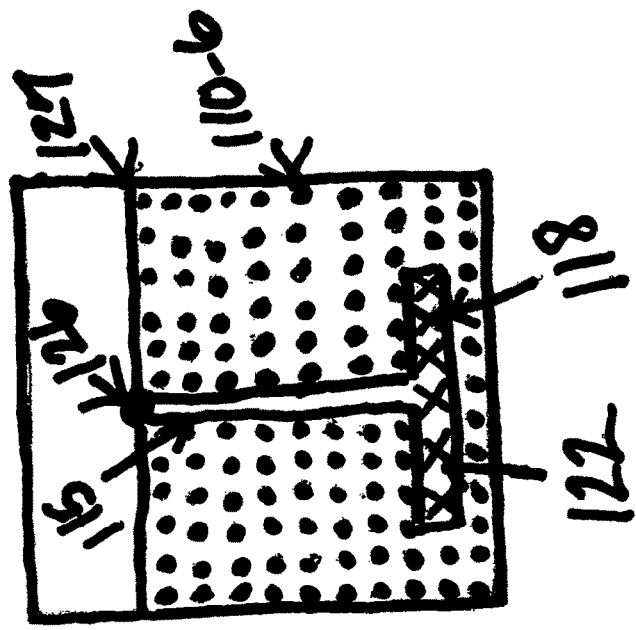
FIG. 5 is an elevation view from the front of the system.
Figure 6:
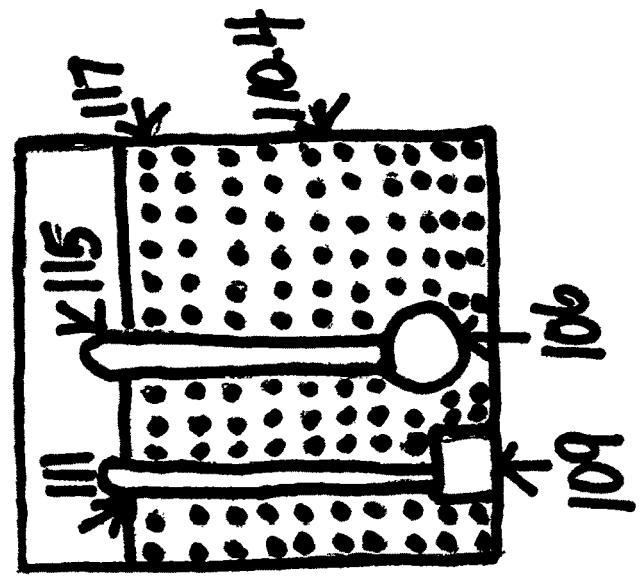
FIG. 6 is an elevation view from the front of the system.
Figure 7:
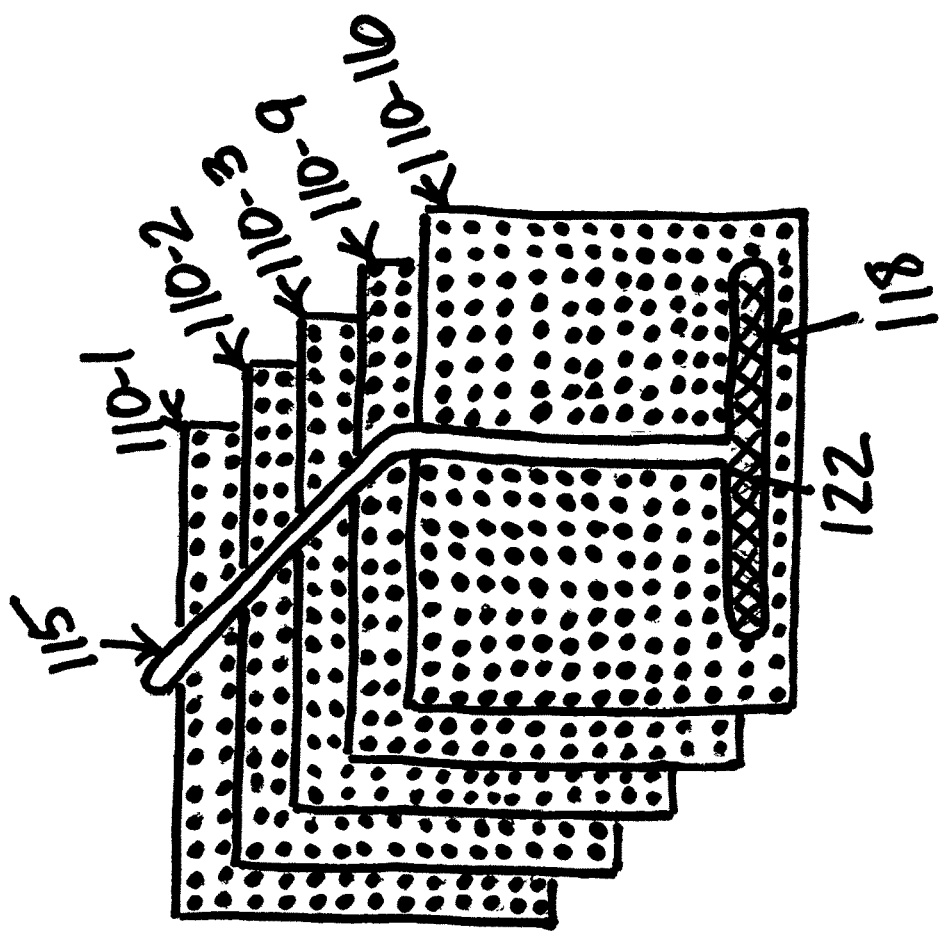
FIG. 7 is a perspective view of the reactive plates as viewed from the back of the system.
Figure 8:
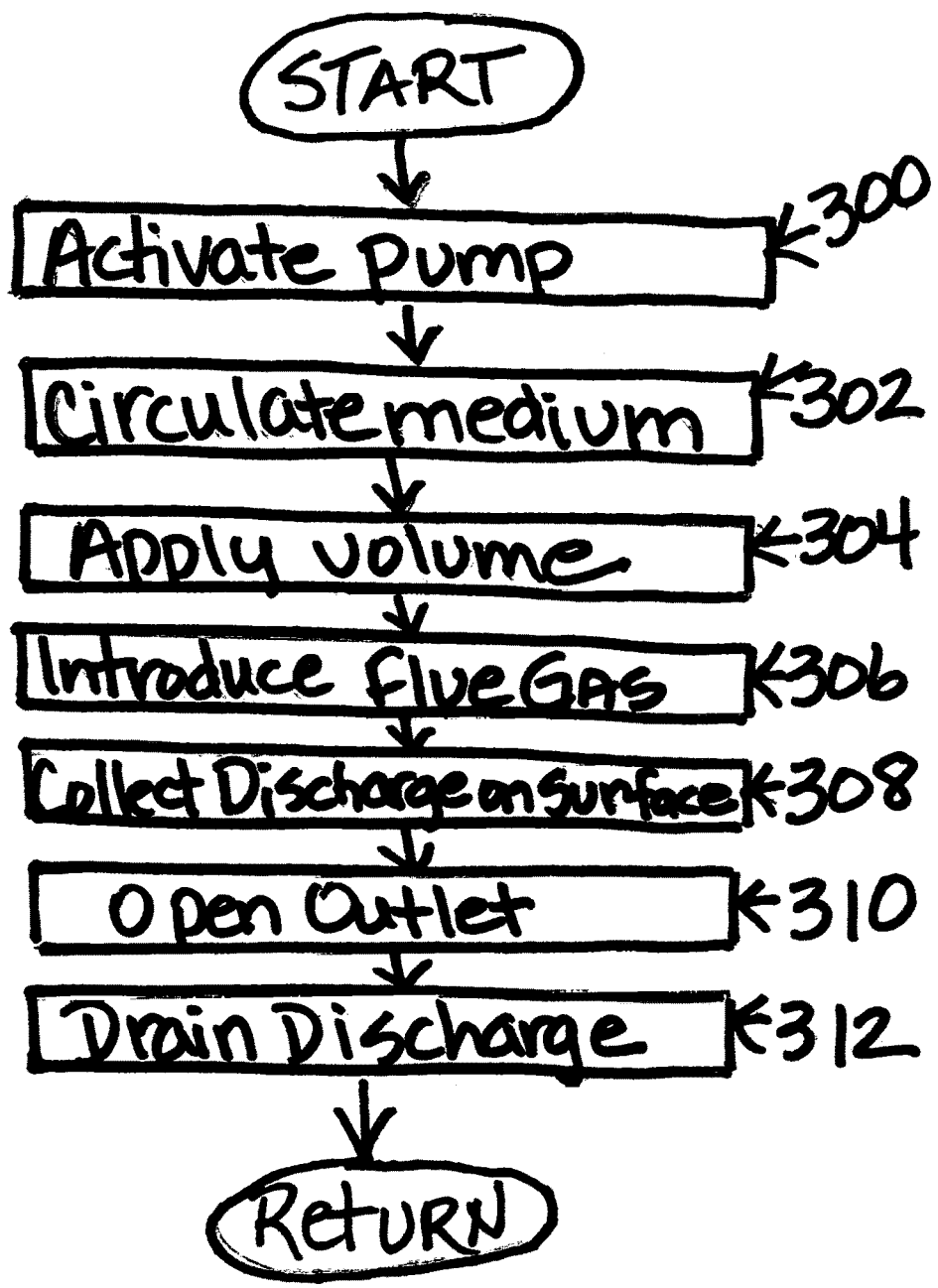
FIG. 8 is a flow chart showing a sequence of steps executed during operation of the system.

Directing attention to FIG. 1, there is shown an elevation view as seen from the side of hydrocarbon removal system 100. For explanation purposes, an oil-fired burner 102, such as used in oil well-servicing operations, and generating 107K BTUs per hour, is connected to emission pipe 104, and serves as a hydrocarbon emission source, i.e., a source of hydrocarbon combustion flue gas. Emissions from burner 101 are drawn by eduction (suction via a Venturi effect) into emission pipe 104 connected to the liquid circulated by pump 106, which circulates liquid medium (including water medium) through circulation pipe 115 placed within closed vessel 108 above plates 110. Vessel 108 can be constructed from PE plastic or any non-conducting material. For ease of understanding, the operation of system 100, vessel 108 appears in a perspective view with the top portion removed so that the elements inside are viewable in FIG. 2. While five plates are illustrated with exaggerated dimensions for clarity, in the preferred embodiment, there are 12 plates 110-1, 110-2 . . . 110-12 that are spaced apart, each plate containing a plurality of apertures. Plates 110 are mounted to the walls 112 and floor 114 of vessel 108. In some embodiments, circulation pipe 115 has an elbow that turns downward behind the rearmost plate 110-n and connects to discharge pipe 118. In some embodiments, discharge pipe 118 is perpendicular to circulation pipe 115. As shown in FIGS. 5-6, vessel 108 is filled with a liquid medium to a height that covers plates 110 and is about level with outlet 126. Pump 106 builds a desired pressure and velocity and discharges through a mixture of water and hydrocarbons from slit 120 (FIG. 3) in the bottom of discharge pipe 118 that is wrapped in metallic screen material 122 (FIGS. 6-7). Reactive plates 110 are made of a different metal from the metal of screen 122 and a wide variety of metals can be used for both screen 122 and plates 110, depending on the nature of the emissions supplying Greenhouse Gases to system 100. For example, in the preferred embodiment, plates 110 and screen 122 are constructed from varying types of steel. Screen 122 is a negative ground point (−) and power source 109 supplies through conduit 111 and plates 110 are connected to positive (+) leads supplied through conduit 111 (as shown in FIG. 4). A predetermined voltage and amperage are applied to plates 110. A reaction starts at screen 122 where hydrocarbons and liquid medium are dispensed near floor 114 near the rear of vessel 108. This reaction continues through the holes in plates 110 and results in a layer of discharge mostly formed on the surface of the liquid medium contained in vessel 108. The discharge layer forms as a film that increases in volume as system continues to operate and the discharge remains in liquid and semisolid form. In some embodiments, the discharge layer also contains particulate matter that was previously dissolved in the medium.

Operation of system 100 is performed in the following sequence of steps. First, at act 300, pump 106 is activated, and water in vessel 108 is circulated at act 302. Next, at act 304, required voltage is applied to vessel 108 from the power source 109. Next, at act 306, a flue gas source is introduced to vessel 108 through emission pipe 104, which meets pumped medium at eductor union 124 and flows into vessel 108 with medium being circulated by pump 106. After discharge accumulates on the surface of the medium in vessel 108 at act 308, outlet 126 is opened at act 310, and the discharge is drained from vessel 108 and collected at act 312. The collected discharge then can be used for various purposes in several applications (such as, DEHA in making of plastic, parking lot tar and asphalt in road works, etc.), some known and some yet to be analyzed.

Selection of pump 106 is based on volume and flow requirements. Similarly, the specifications of the emission pipe 104 are determined by desired pressure and flow rates of the flue gases. For example, in the preferred embodiment, emission pipe 104 has a diameter of approximately two inches.

Dissimilar metal is required for plates 110 and the screen 122. Discharge through slit 116 at the bottom of discharge pipe 118 is set at a height from floor 114 of vessel 102 to get the best results. Vessel 108, in some embodiments, is semi-transparent. However, in other embodiments, vessel 108 is nontransparent because of temperature requirements.

In some embodiments, cooling or refrigeration components can be applied to the outside of the vessel 108. In some embodiments, system 100 is mobile and can be used wherever needed. For example, system 100 can be mounted on a truck bed or trailer and hauled wherever it is needed, such as to well heads in oil-producing fields where hydrocarbons are captured rather than released into the atmosphere, with pump 106 and power source 109 connected to a power source such as generator located onboard or onsite.

While a system and method for removing Greenhouse Gases from a vessel containing circulating medium and reactive plates has been described and illustrated in detail in the preferred embodiment, it is to be understood that numerous changes and modifications can be made to the present invention without departing from the spirit or principles thereof.

I claim:

1. A method or process of removing and converting into residual matters the harmful gases essentially comprising in varied proportions oxides of carbon, oxides of sulfur, oxides of nitrogen, sulfides of hydrogen, volatile organic compounds, hydrocarbons, mercury, particulate matters and black carbon, benzene, toluene, xylene, 1,3-butadiene, formaldehyde, ethyl-benzene, n-hexane and many trace elements from the emissions from fossil fuels and non-fossil fuels, said method comprising the steps of:
  (i) providing an apparatus comprising a vessel, a circulating liquid medium, a plurality of positively charged metal plates, a negatively charged discharge pipe connected to the circulation pipe and wrapped up by a metallic screen near the floor of the said vessel, a circulation pump connected to the circulation inlet and the circulation outlet and configured to circulate the said liquid medium, a power source having positive and negative connections, a source of flue gas emissions from combustion of fossil or non-fossil fuels, and an eductor to draw the said flue gases into an emission pipe and mix them with the liquid medium in the circulation pipe;
  (ii) activating the circulation pump unit that builds pressure and velocity to start circulation of the liquid medium within the vessel and the circulation pipe to aid electrochemical reactions;
  (iii) introducing an emission source from which the flue gases flow through the emission pipe drawn by eduction suction via a Venturi effect to meet the circulating liquid medium at the eductor union, and are discharged as a mixture of emissions with the liquid medium at the bottom of discharge pipe in the vessel;
  (iv) applying from the power source required voltage and amperage to the plurality of metal plates via positive leads and to the metallic screen via a negative lead;
  (v) starting electrochemical reactions at the said metallic screen covering the discharge pipe and at the plurality of metal plates involving the liquid medium mixed with flue gases;
  (vi) causing the formation of layer(s) of residual matters immersed in and/or floating at the top of the liquid medium; and
  (vii) resulting in a steady outflow of cleaner gases with substantial reduction, removal or conversion of several harmful gases that exit the vessel through the designed exit at the top of the vessel.

2. The method of removing and converting harmful gases from emissions from fossil and non-fossil fuels of claim 1, including a step of applying a refrigeration system to provide cooling to the said vessel and its internal components in hot ambient conditions.

3. The method of removing and converting harmful gases from emissions from fossil and non-fossil fuels of claim 1, including a step of applying this method by connecting said apparatus anywhere near or after the tailpipe(s) of the transport sector vehicles, passenger vehicles, ships, trains, trucks, buses, tractors, diesel generators and pumps.

4. The method of removing and converting harmful gases from emissions from fossil and non-fossil fuels of claim 1, including the step of applying this method by connecting to said apparatus anywhere after the Electrostatic Precipitators (ESP) or before the flue gas stack/ chimney of power plants, refineries and other industrial plants having emissions from fossil or non-fossil fuels.

5. A method or process of removing and converting into residual matters the harmful gases essentially comprising in varied proportions oxides of carbon, oxides of sulfur, oxides of nitrogen, sulfides of hydrogen, volatile organic compounds, hydrocarbons, mercury, particulate matters and black carbon, benzene, toluene, xylene, 1,3-butadiene, formaldehyde, ethyl-benzene, n-hexane and many trace elements from the emissions from fossil fuels and non-fossil fuels, said method comprising the steps of:
  (i) providing an apparatus comprising a vessel, a circulating liquid medium, a plurality of positively charged metal plates, a negatively charged discharge pipe connected to the circulation pipe and wrapped up by a metallic screen near the floor of the said vessel, a power source having positive and negative connections, a source of flue gas emissions from combustion of fossil or non-fossil fuels wherein the incoming flue gas has enough pressure and flow rate that is sufficient to mix itself with the liquid medium, flow into the vessel via the circulation pipe, and provide enough pressure for the liquid medium to circulate;
  (ii) introducing an emission source from which the flue gases flow with adequate pressure, thereby mixing well with the liquid medium, getting discharged at the bottom of discharge pipe in the vessel, and causing the said liquid medium to circulate;
  (iii) applying from the power source required voltage and amperage to the plurality of metal plates via positive leads and to the metallic screen via a negative lead;
  (iv) starting electro-chemical reactions at the said metallic screen covering the discharge pipe and at the plurality of metal plates involving the liquid medium mixed with flue gases;
  (v) causing the formation of layer(s) of residual matters immersed in and/or floating at the top of the liquid medium; and
  (vi) resulting in a steady outflow of cleaner gases with substantial reduction, removal or conversion of several harmful gases that exit the vessel through the designed exit at the top of the vessel.

6. The method of removing and converting harmful gases from emissions from fossil and non-fossil fuels of claim 5, including a step of applying a refrigeration system to provide cooling to the said vessel and its internal components in hot ambient conditions.

7. The method of removing and converting harmful gases from emissions from fossil and non-fossil fuels of claim 5, including the step of applying this method by connecting to said apparatus anywhere near or after the tailpipe(s) of the transport sector vehicles, passenger vehicles, ships, trains, trucks, buses, tractors, diesel generators and pumps where the flue gas flows have enough pressure to mix well with liquid medium and cause the liquid medium to circulate.

8. The method of removing and converting harmful gases from emissions from fossil and non-fossil fuels of claim 5, including the step of applying this method by connecting to said apparatus anywhere after the Electrostatic Precipitators (ESP) or before the flue gas stack/ chimney of power plants, refineries and other industrial plants having emissions from fossil or non-fossil fuels.

* * * * *